United States Patent [19]
Itai et al.

[11] Patent Number: 6,160,712
[45] Date of Patent: Dec. 12, 2000

[54] EXPANSION-CARD SUPPORT STRUCTURES AND INFORMATION APPARATUS HAVING A CARD SUPPORT STRUCTURE

[75] Inventors: Fumio Itai, Konosu; Ichiro Nagasawa, Iruma, both of Japan

[73] Assignee: Kabushiki Kaisha Toshiba, Kawasaki, Japan

[21] Appl. No.: 09/258,076

[22] Filed: Feb. 26, 1999

[30] Foreign Application Priority Data

Feb. 27, 1998 [JP] Japan .................. 10-048266

[51] Int. Cl.$^7$ .................. H05K 7/12; G06F 1/16
[52] U.S. Cl. .................. 361/759; 361/686; 361/801; 361/807; 24/563
[58] Field of Search .................. 361/683, 686, 361/752, 753, 754, 759, 796, 797, 801, 802, 807, 809–810, 825; 174/66, 67, 52.1; 439/377, 631; 206/706; 211/41.17; 220/4.02; 24/542, 545, 563; 312/222; 364/708.1

[56] References Cited

U.S. PATENT DOCUMENTS 5,317,483 5/1994 Swindler .................. 361/801
5,757,618 5/1998 Lee .................. 361/686
5,936,835 8/1999 Astier .................. 361/683

*Primary Examiner*—Jayprakash N. Gandhi
*Attorney, Agent, or Firm*—Finnegan, Henderson, Farabow, Garrett & Dunner, L.L.P.

[57] ABSTRACT

An expansion card support structure including a card receptacle having a support wall having an expansion slot and a card insertion port open to the support wall. An expansion card has been removably inserted into the card receptacle through the card insertion port. The expansion card has a substrate and a connection bracket covering the one expansion slot. A lock member is provided in the card receptacle. The lock member removably secures the connection bracket to the support wall. The lock member is supported in the card receptacle to rotate between first and second positions. The lock member contacts the connection bracket while remaining at the first position, thereby to lock the expansion card in the card receptacle. It is spaced apart from the connection bracket while remaining at the second position, thereby to release the expansion card from the card receptacle. It contacts the connection bracket and is elastically deformed while remaining at the first position, thereby to clamp the connection bracket in cooperation with the support wall.

15 Claims, 11 Drawing Sheets ively, from within the card receptacle 1a. The slot covers 6 are secured to the slot panel 4 by means of screws 7. Each slot cover 6 can be removed from the slot panel 4, so that an expansion card 3 may be inserted into the card receptacle 1a.

EXPANSION-CARD SUPPORT STRUCTURES AND INFORMATION APPARATUS HAVING A CARD SUPPORT STRUCTURE

BACKGROUND OF THE INVENTION

The present invention relates to a card support structure for removably supporting an expansion card such as an ISA-type card or a PCI-type card, and also to an information apparatus, such as a PC server or a desk-top computer, which has the card support structure.

PC servers are becoming indispensable in LAN systems, because they link a plurality of workstations and computers, thereby accomplishing an efficient use of the local area networks. A PC server has a housing. The housing contains a hard disk drive of a large storage capacity, a floppy disk drive, and an optical disk drive. The housing also contains a user-open area, in which expansion cards (i.e., optional components) may be held.

FIG. 16 shows the user-open area 1 provided in a conventional PC server. In the user-open area 1, a card receptacle 1a is provided. The card receptacle 1a is designed to removably support a plurality of expansion cards 3. The card receptacle 1a has a slot panel 4 extending in the height direction of a housing 2. The slot panel 4 has a plurality of expansion slots 5 (only one shown). The expansion slots 5 extend parallel to one another and are spaced apart in the height direction of the housing 2.

The expansion slots 5 are covered with slot covers 6, respectively, from within the card receptacle 1a. The slot covers 6 are secured to the slot panel 4 by means of screws 7. Each slot cover 6 can be removed from the slot panel 4, so that an expansion card 3 may be inserted into the card receptacle 1a.

Each expansion card 3 comprises a substrate 8 and a connection bracket 9. The connection bracket 9 is made of metal and coupled to one edge of the substrate 8. The bracket 9 has substantially the same shape and the same size, covering one expansion slot 5 from within the card receptacle 1a. The bracket 9 is secured to the slot panel 4 by means of a screw 7. The expansion card 3 is thereby secured to the card receptacle 1a.

In this conventional structure for supporting expansion cards 3, each expansion card 3 is fixed to the slot panel 4 by a screw 7. Hence, a screw 7 must be manually set in the screw hole made in the slot panel 4 in order to hold an expansion card 3 in the card receptacle 1a and released from the screw hole in order to remove the card 3 from the card receptacle 1a. To perform the manual work, the user needs to use a tool such as a screwdriver. Further, much time and labor are required to hold the card 3 in the card receptacle 1a and remove the same from the card receptacle 1a. Still further, the connection bracket 9 may get loose if not sufficiently clamped with the screw 7, inevitably contacting the adjacent connection bracket 9 or the slot cover 6 covering the adjacent expansion slot 5.

The specification of U.S. Pat. No. 5,317,483 discloses a structure comprising a metal locking bar that holds a plurality of expansion cards in a card receptacle. The locking bar extends in the direction in which the expansion cards are arranged. The locking bar is rotatably connected at its first end to a slot panel and removably fastened at its second end to the slot panel by means of a screw. The locking bar has a pushing portion that extends between the first and second ends. As long as the second end is fastened to the slot panel, the locking bar cooperates with the slot panel, clamping the expansion cars in the card receptacle.

The metal locking bar can fasten a plurality of expansion cards to the slot panel, making it unnecessary for the user to fasten the cards, one by one, to the slot panel by using screws. Expansion cards can therefore be set into the card receptacle and removed therefrom more quickly than into and from the card receptacle 1a shown in FIG. 16.

The structure disclosed in U.S. Pat. No. 5,317,483 is, however, disadvantageous in the following respect.

Expansion cards have the same size and the same shape which accord with the prescribed standards. The connection brackets of the cards, which the metal locking bar contacts, differ in the thickness and shape of their edges, because there are no standards for the connection brackets. Some of the various types of expansion cards available in the market have a connection bracket having a projection at one end. The projection needs to firmly contact the slot panel when the locking bar presses the connection bracket onto the slot panel. This is why the edges of the connection brackets differ in shape and size, in accordance with the types of the expansion cards.

If the edges of the connection brackets differ in shape and thickness in accordance with the types of the expansion cards, the pressure the metal locking bar applies to one expansion card will differ from the pressure it applies to another expansion card. The pressure the bar applies to one expansion card may be too low to hold the card steadily. Consequently, the card may not be held firmly at a correct position.

BRIEF SUMMARY OF THE INVENTION

The first object of the present invention is to provide an expansion-card support structure that can lock and unlock expansion cards easily, without using a tool, and can hold expansion cards reliably, regardless of the sizes and shapes of the cards, and also to provide an information apparatus that has the expansion-card support structure.

The second object of the invention is to provide an expansion-card support structure of the same type as described above, which can firmly hold expansion cards even if an external force is exerted on the connection bracket of each card to push the bracket into a card receptacle.

The third object of this invention is to provide an expansion-card support structure of the same type as described above, which prevent the connection bracket of one expansion card from interfering with that of an adjacent expansion card even if a lock member is rotated to a particular position.

To achieve the first object described above, an expansion-card support structure according to a first aspect of the invention comprises: a card receptacle comprising a card insertion port and a support wall having at least one expansion slot; at least one expansion card removably inserted into the card receptacle through the card insertion port and having a substrate and a connection bracket which is connected to an edge of the substrate and which covers the expansion slot; and at least one lock member provided for the expansion slot and supported in the card receptacle to rotate between first and second positions. While remaining at the first position, the lock member contacts the connection bracket thereby to lock the expansion card in the card receptacle. While remaining at the second position, the lock member is spaced apart from the connection bracket thereby to release the expansion card from the card receptacle. While remaining at the first position, the lock member contacts the connection bracket and is elastically deformed thereby to clamp the connection bracket in cooperation with the support wall.

In order to achieve the first object, too, an information apparatus according to the invention comprises: a housing; a card receptacle provided in the housing, comprising a support wall having a plurality of expansion slots arranged in a column and spaced part from one another, and a card insertion port open to the support wall; a plurality of expansion cards removably inserted in the card receptacle through the card insertion port, each of the expansion cards having a connection bracket covering one expansion slot and a substrate connected to the connection bracket; and a plurality of lock members provided for the expansion slots, arranged at intervals in a direction in which the expansion slots are arranged in a column, and supported in the card receptacle to rotate between first and second positions. Each of the lock members contacts the connection bracket while remaining at the first position, thereby to lock the expansion card in the card receptacle. While remaining at the second position, each lock member is spaced apart from the connection bracket, thereby to release the expansion card from the card receptacle. While remaining at the first position, each lock member contacts the connection bracket and elastically deformed, thereby to clamp the connection bracket in cooperation with the support wall.

To hold an expansion card in the card receptacle, one lock member is rotated to the second position. The expansion card is inserted into the card receptacle through the card insertion port, until the connection bracket overlaps the support wall of the receptacle and covers one expansion slot. Then, the lock member is rotated to the first position and elastically abuts on the connection bracket, pressing the bracket onto the support wall. The connection bracket is thereby clamped between the support wall and the lock member. As a result, the expansion card is locked in the card receptacle.

To remove the expansion card from the card receptacle, the lock member is rotated from the first position to the second position. At the second position the lock member releases the connection bracket of the expansion card. The expansion card can therefore be removed from the card receptacle through the card insertion port.

The expansion card can be locked in the card receptacle and removed therefrom, merely by rotating the lock member. There is no need to use a tool, such as a screwdriver, to lock the card in, or removed it from, the card receptacle. The expansion card can therefore be locked in and removed from the card receptacle, both easily and quickly.

When the lock member contacts the connection bracket, it is deformed elastically. The lock member therefore applies a sufficient pressure on the connection bracket, regardless of the size and shape of the connection bracket. Hence, so long as the lock member remains in the first position, it applies a sufficient pressure on the bracket, holding the bracket steadily in the card receptacle.

In order to attain the second object described above, an expansion card support structure according to the invention comprises: a card receptacle comprising a card insertion port and a support wall having at least one expansion slot; an expansion card removably inserted into the card receptacle through the card insertion port and including a connection bracket covering the expansion slot and a substrate connected to the connection bracket, said connection bracket having a main body extending along the expansion slot, an engagement strip extending form an end of the main body at substantially right angles toward the support wall, and a corner defined by the main body and the engagement strip; and a lock member provided for the expansion slot and supported in the card receptacle to rotate between first and second positions. The lock member contacts the corner of the connection bracket while remaining at the first position, thereby to lock the expansion card in the card receptacle. While remaining at the second position, the lock member is spaced apart from the connection bracket thereby to release the expansion card from the card receptacle. While remaining at the first position, the lock member contacts the corner and elastically deformed, thereby to clamp the connection bracket in cooperation with the support wall.

When the lock member is rotated from the second position to the first position, with the expansion card inserted in the card receptacle, it elastically abuts on the corner of the connection bracket. The connection bracket is thereby pressed onto the support wall and clamped between the support wall and the lock member. As a result, the expansion card is locked in the card receptacle.

When the lock member is rotated from the first position to the second position, the lock member releases the corner of the connection bracket of the expansion card. The expansion card can therefore be removed from the card receptacle through the card insertion port.

Since the lock member pushes the corner of the bracket, the pushing force exerted on the bracket is divided into a first component applied in the direction of inserting the expansion card into the card receptacle and a second component applied toward support wall. The second component works against an external force, if any, exerted to the main body of the bracket to push the same into the card receptacle. Hence, the expansion card would not be pushed into the card receptacle.

In order to achieve the third object described above, an expansion card support structure according to this invention comprises: a card receptacle comprising a support wall having a plurality of expansion slots arranged in a column and spaced part from one another, and a card insertion port open to the support wall, said support wall comprising a first wall having the expansion slots and a second wall extending outwardly at substantially right angles from one end of the first wall; a plurality of expansion cards removably inserted in the card receptacle through the card insertion port, each of the expansion cards including a connection bracket covering one expansion slot and a substrate connected to the connection bracket, said connection bracket having a main body overlapping the first wall and closing the expansion slot, an engagement strip made integral with an end of the main body and overlapping the second wall, and a corner defined by the main body and the engagement strip; and a plurality of lock members provided for the expansion slots, respectively, opposing the second wall, arranged at intervals in a direction in which the expansion slots are arranged in a column, and supported in the card receptacle to rotate between first and second positions. Each of said lock members contacts the corner of the connection bracket while remaining at the first position, thereby to lock the expansion card in the card receptacle. While remaining at the second position, each lock member is spaced apart from the connection bracket, thereby to release the expansion card from the card receptacle. While remaining at the first position, each lock member contacts the corner and is elastically deformed, thereby to clamp the connection bracket in cooperation with the support wall. Each lock member has escaping parts for preventing the lock member from interfering with the engagement strip of an expansion card adjacent to the expansion card.

When any lock member is rotated from the second position to the first position, with an expansion card inserted in the card receptacle, it abuts on the corner of the connection bracket of the expansion card. The connection bracket is thereby pressed onto the support wall and clamped between the support wall and the lock member. As a result, the expansion card is locked in the card receptacle.

When the lock member is rotated from the first position to the second position, the lock member releases the corner of the connection bracket of the expansion card. The expansion card can therefore be removed from the card receptacle through the card insertion port.

Thanks to the escaping parts, each lock member does not interfere with the engagement strip even when it is rotated to the first position. Hence, the locking member for the adjacent expansion card does not hinder the insertion of the expansion card into the card receptacle or the removal of the card from the card receptacle.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The first embodiment of this invention, which is incorporated in a PC server, will be described with reference to FIGS. 1 to 12.

Figure 1:
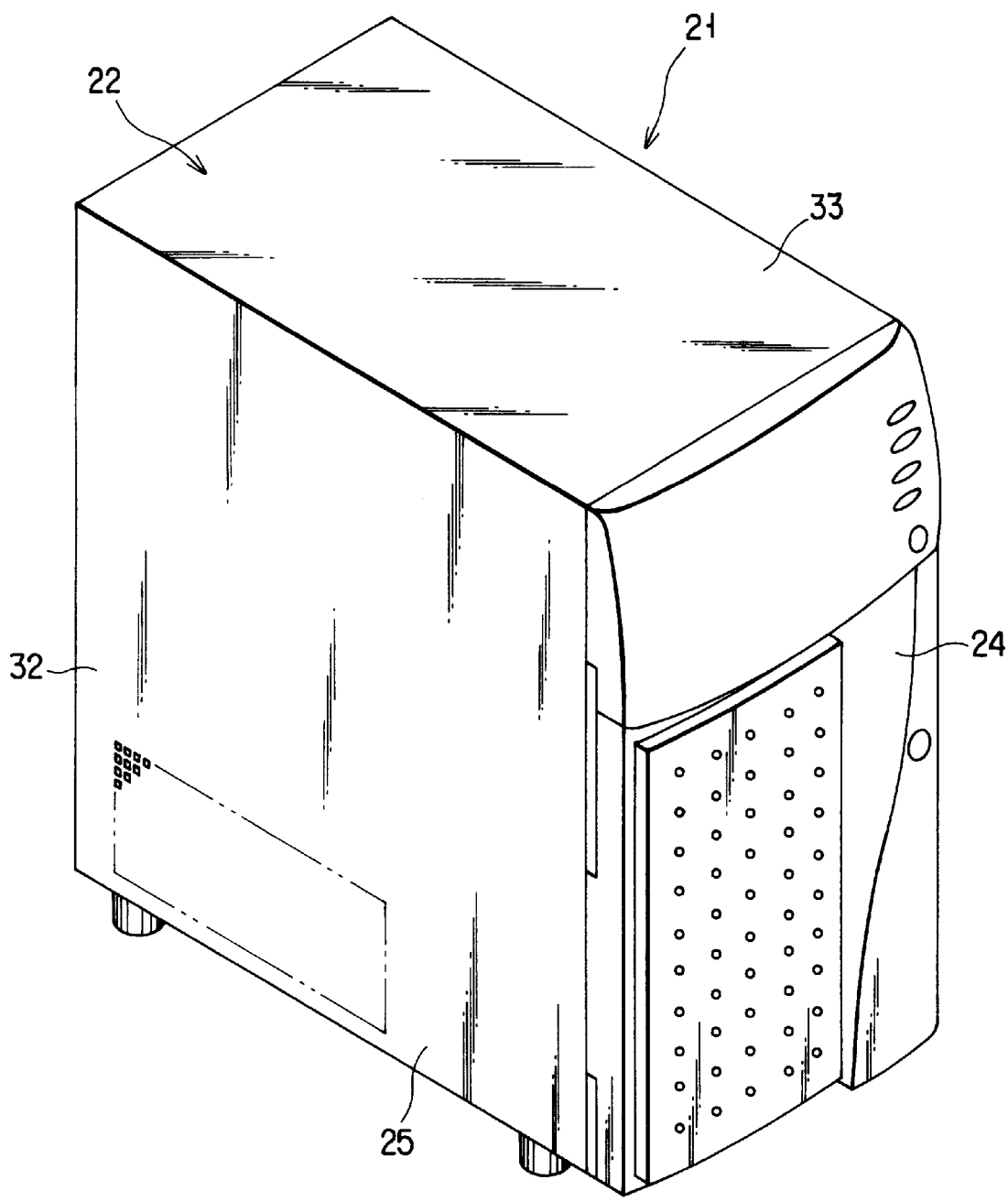
FIG. 1 is a perspective view of a PC server incorporating the first embodiment of the present invention.

FIG. 1 shows the PC server 21 that is to be connected to desktop computers, printers, and the like. The PC server 21 has a housing 22, which is a tall rectangular box. As shown in FIGS. 1 to 4, the housing 22 comprises a metal frame 23, a front cover 24, and a body cover 25. The front cover 24 is secured to the front of the frame 23. The body cover 25 is removably fastened to the frame 23.

The frame 23 comprises a bottom wall 26, a front wall 27, and a rear wall 28. The front wall 27 and rear wall 28 extend upwards from the front and rear edges of the bottom wall 26, respectively. The front wall 27 and rear wall 28 therefore oppose each other, spaced part in the depth direction of the housing 22. A plurality of connecting beams extend between the upper edges of the front wall 27 and rear wall 28, connecting the walls 27 and 28 together. The frame 23 has an opening 29 in the side of the housing 22.

The body cover 25 covers up the frame 23. The body cover 25 comprises a side wall 32 and a top wall 33. The side wall 32 cover the opening 29 of the frame 23. The top wall 33 connects the upper edges of the side wall 32. The frame 23 and the side wall 32 of the body cover 25 define a user-open area 35, which is provided within the housing 22.

Figure 2:
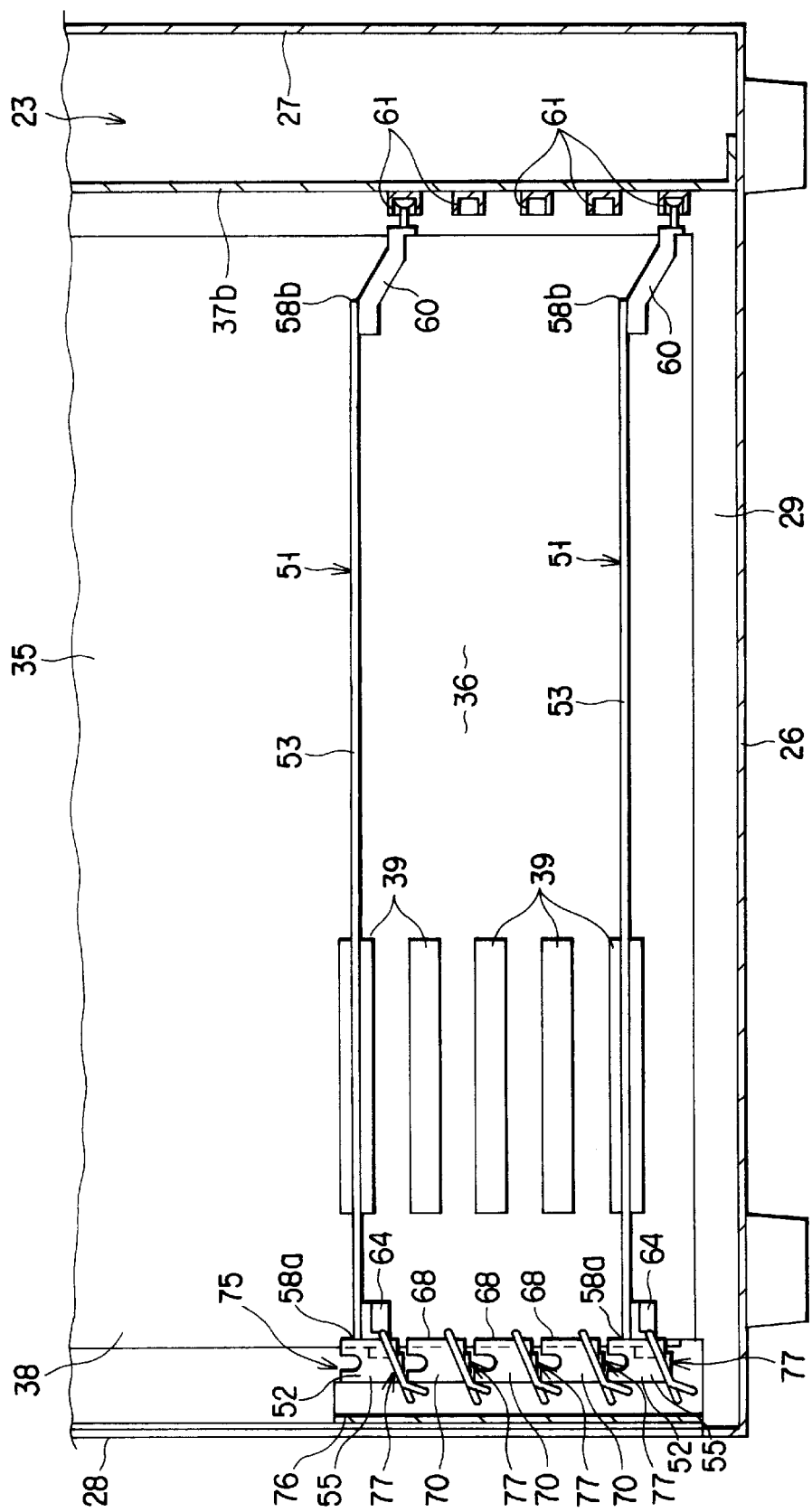
FIG. 2 is a sectional view of the PC server, showing the card receptacle provided in the PC server.
Figure 3:
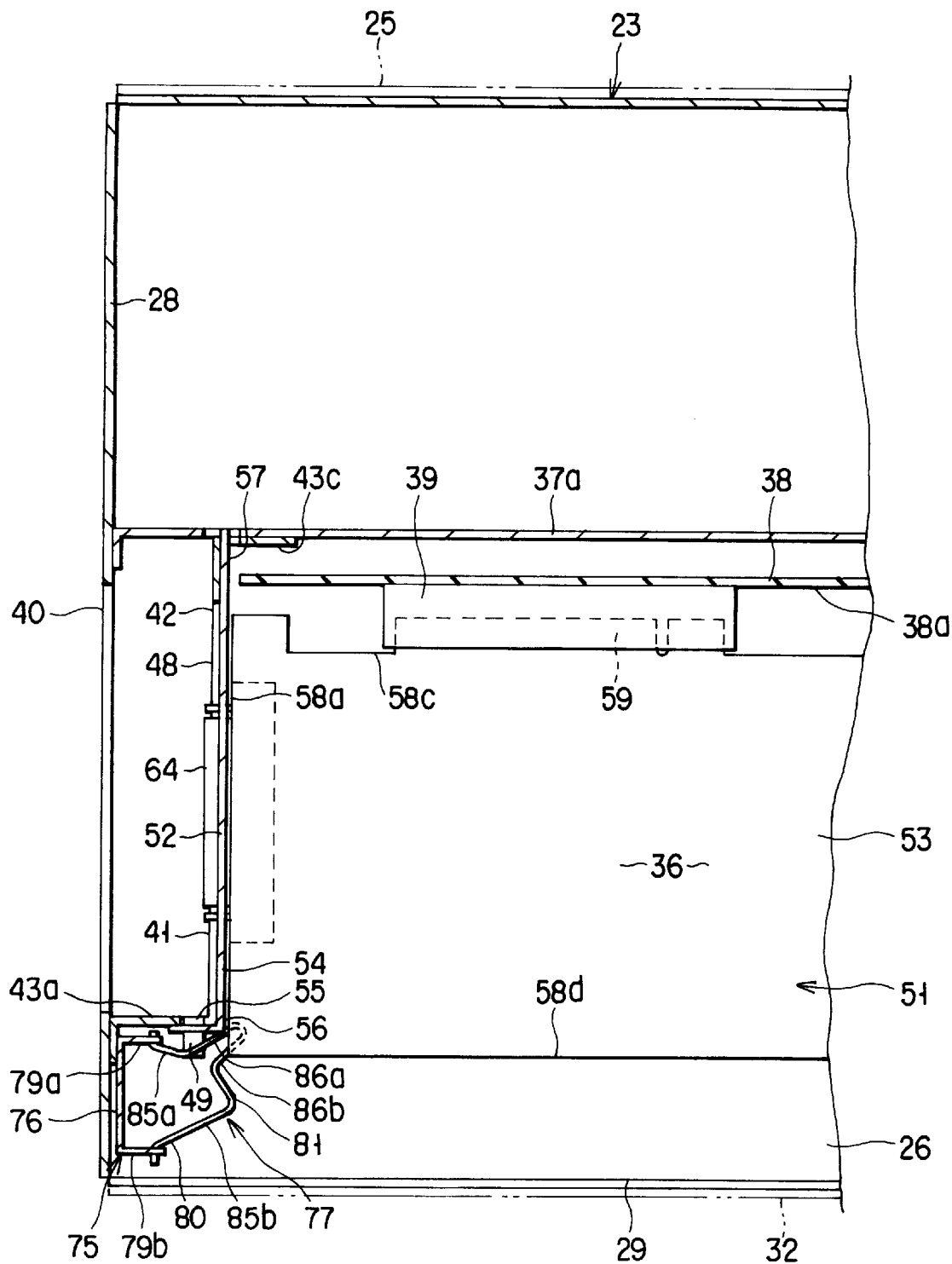
FIG. 3 is a sectional view of the PC server, illustrating the positional relation between a lock member and the connection bracket of an expansion card.

A card receptacle 36 is provided in the user-open area 35, for removably holding a plurality of expansion cards 51, i.e., optional components. As is best shown in FIGS. 2 and 3, the frame 23 has two partitions 37a and 37b extending upwards from the bottom wall 26. The first partition 37a extends between the front wall 27 and the rear wall 28 and is connected at its rear edge to the rear wall 28. The second partition 37b extends in the widthwise direction of the housing 22, along the front edge of the bottom wall 26, and opposes the rear wall 28. The card receptacle 36 is a space that is defined by the bottom wall 26 and the rear wall 28 of the frame 23, the first and second partitions 37a and 37b, and the side walls 32 of the body cover 25. The card receptacle 36 is exposed through the opening 29 of the frame 23 when the body cover 25 is removed from the frame 23. The opening 29 function as card insertion ports that communicate with the card receptacle 36.

As shown in FIGS. 2 and 3, the first partition 37a supports a circuit board 38. The circuit board 38 stands upright, extending perpendicular to the bottom wall 26 of the frame 23. The board 38 also extends in the depth direction of the housing 22. The lower portion of the board 38 is exposed to the card receptacle 36.

The circuit board 38 has a surface 38a opposing the opening 29 of the frame 23. A plurality of card connectors 39 are mounted on each surface 38a of the circuit board 38. The card connectors 39 extend horizontally, in the depth direction of the housing 22. They are positioned parallel to one another, spaced apart in the height direction of the housing 22. The card connectors 39 oppose the opening 29 of the frame 23.

Figure 4:
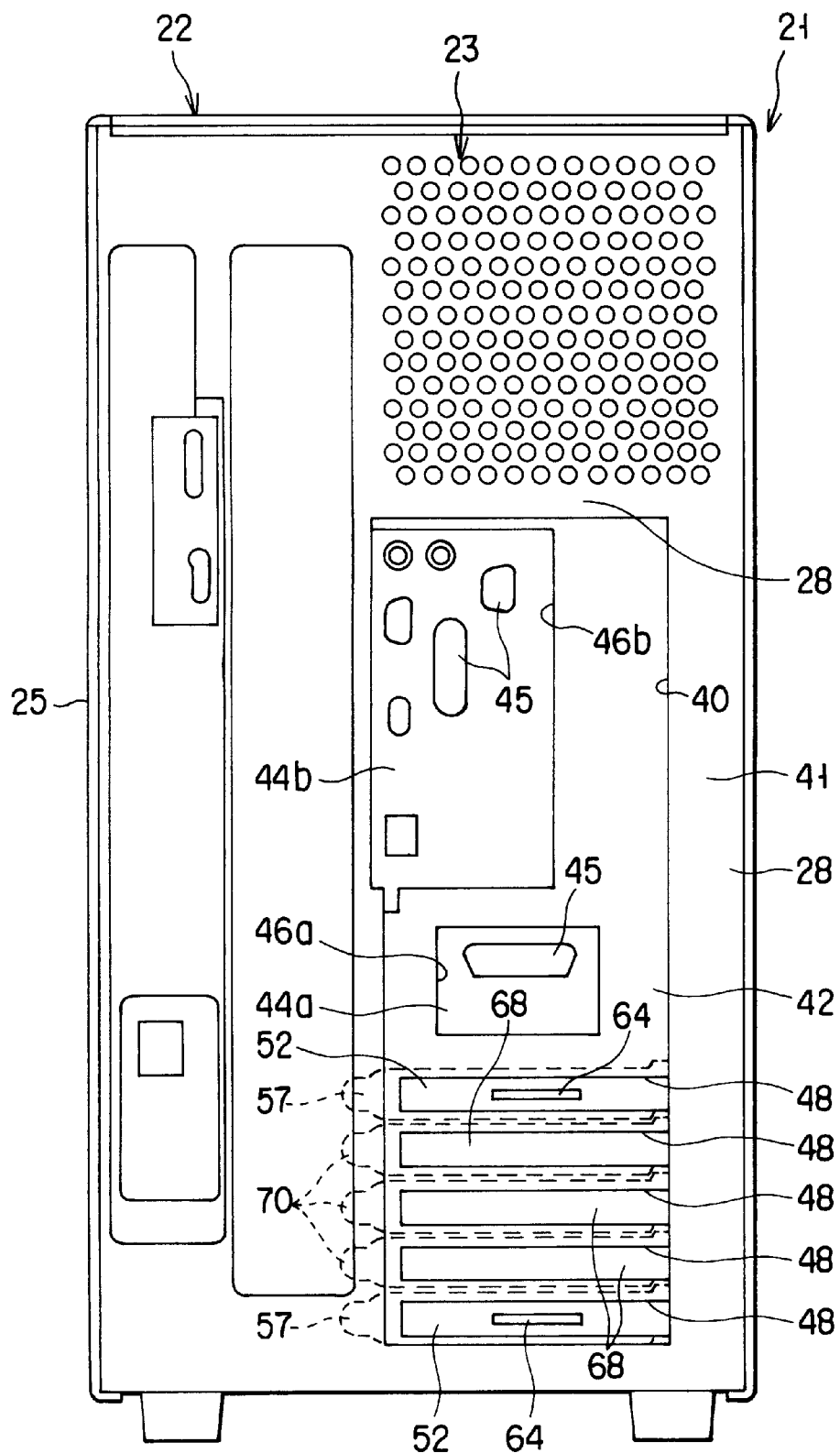
FIG. 4 is a rear view of the PC server.

As illustrated in FIG. 4, the rear wall 28 of the frame 23 has a rectangular opening 40, which extends in the height direction of the housing 22. A metal slot panel 41 covers the rectangular opening 40, from within the housing 22. The slot panel 41 is fastened to the rear wall 28 of the frame 23 with screws.

Figure 5:
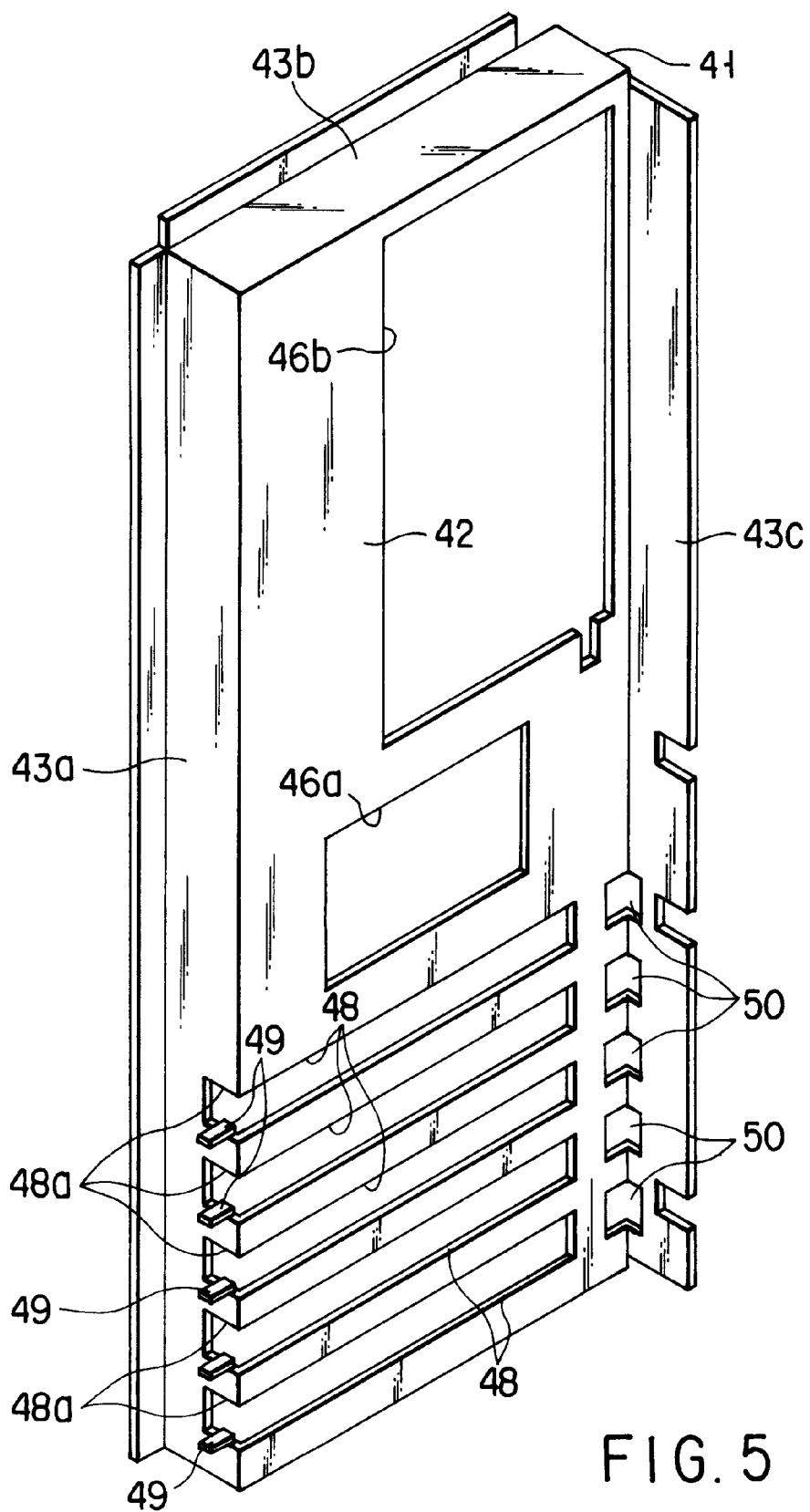
FIG. 5 is a perspective view of the slot panel of the card receptacle.

As seen from FIG. 5, the slot panel 41 comprises four walls 42 and 43a to 43c. The first wall 42 opposes the opening 40, is rectangular like the opening 40 and is arranged parallel to the rear wall 28 of the frame 23. The second wall 43a extends toward the rear wall 28 from one side of the first wall 42, at right angles to the first wall 42. The third wall 43b extends toward the rear wall 28 from the top edge of the first wall 42, at right angles to the first wall 42. The fourth wall 43c extends toward the rear wall 28 from the other side of the first wall 42, at right angles to the first wall 42. The second and third walls 43a and 43b abut, at their distal ends, on the inner surface of the rear wall 28. The fourth wall 43c is aligned with the first partition 37a.

As FIG. 4 shows, a pair of connector panels 44a and 44b are fastened to the first wall 42 of the slot panel 41, by means of screws. Each connector panel has a plurality of connectors 45 that are designed to connect the PC server 21 to apparatuses such as computers, printers and displays. The connectors 45 are exposed at the back of the housing 22, through the connector holes 46a and 46b made in the first wall 42 of the slot panel 41.

The first wall 42 of the slot panel 41 has a plurality of expansion slots 48 communicating with the card receptacle 36. The expansion slots 48 are elongated holes, each extending in the widthwise direction of the housing 22. The slots 48 are spaced apart from, and parallel to, one another. Each slot 48 has an extension 48a that is made in the second wall 43a of the slot panel 41. A stopper strip 49 is provided at the lower edge of the extension 48a of each expansion slot 48. The stopper strip 49 horizontally extends from the second wall 43a toward the opening 29 of the frame 23.

A plurality of engagement holes 50 are made in the corner defined by the first wall 42 and fourth wall 43c of the slot panel 41. The engagement holes 50 are spaced apart in the height direction of the slot panel 41 at the same regular intervals as the expansion slots 48 are spaced apart. Hence, the holes 50 are positioned beside the expansion slots 48, respectively.

Figure 6:
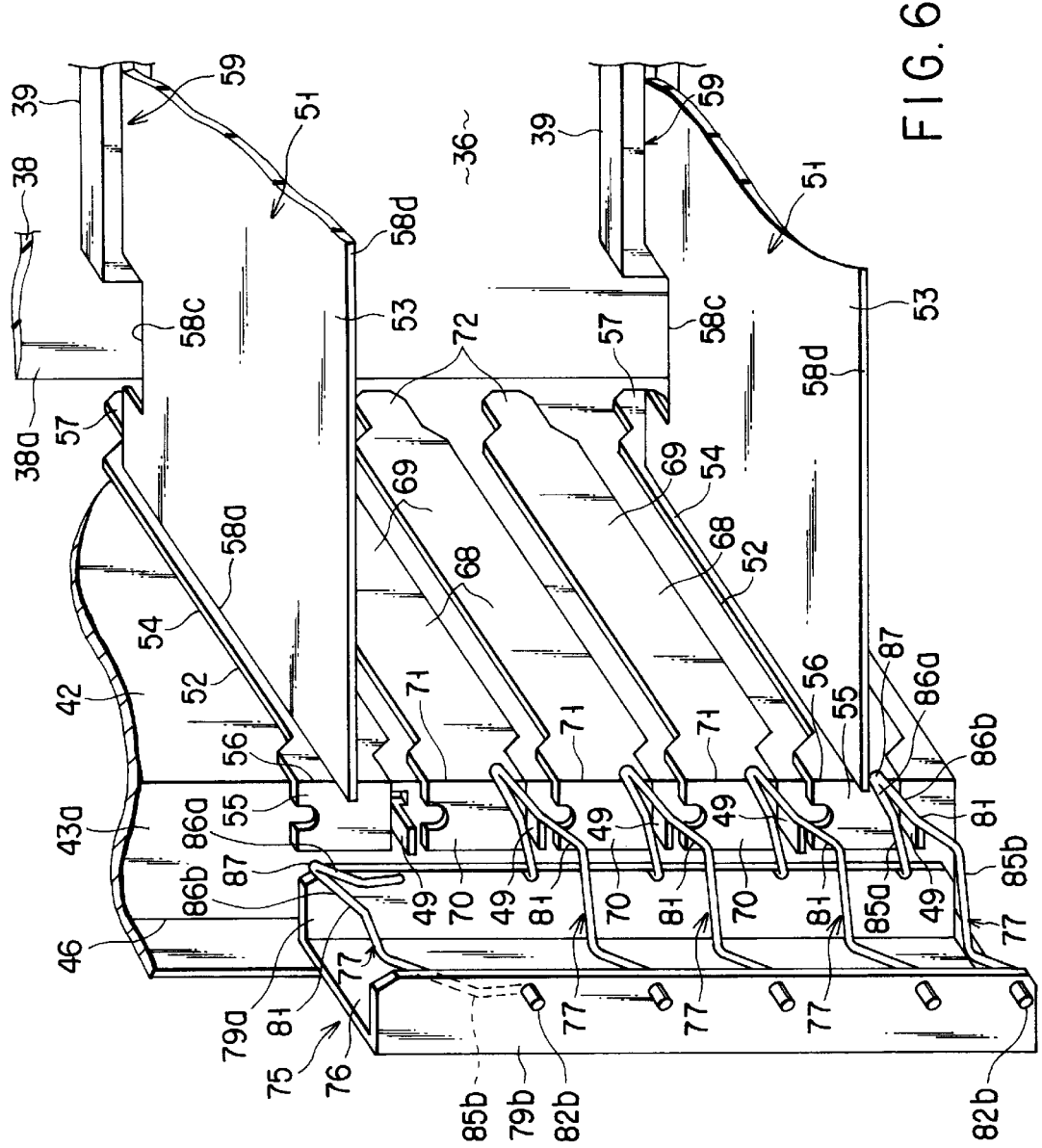
FIG. 6 is a perspective view of the card receptacle, representing the positional relation of the lock members, expansion cards and slot covers.

As shown in FIGS. 2, 3 and 6, each expansion card 51 comprises a connection bracket 52 and a rectangular substrate 53. The connection bracket 52 is made of metal. A plurality of circuit components (not shown), such as semiconductor packages, are mounted on the substrate 53. The connection bracket 52 comprises an elongated main body 54 and an engagement strip 55. The main body 54 extends along one expansion slot 48. The strip 55 is formed integral with one end of the main body 54. The main body 54 overlaps the first wall 42 of the slot panel 41, closing the expansion slot 48 from within the card receptacle 36, when the expansion card 51 is inserted into the card receptacle 36 through the opening 29 of the frame 23.

The engagement strip 55 extends from one end of the main body 54, at right angles thereto. The strip 55 overlaps the second wall 43a of the slot panel 41, closing the extension 48a of the expansion slot 48 from within the card receptacle 36. The lower edge of the strip 55 contacts the stopper strip 49. Thus, the engagement strip 55 supports the engagement strip 55 from below.

The connection bracket 52 has a right-angled corner 56 defined by the main body 54 and the engagement strip 55. The corner 56 opposes the opening 29 of the frame 23 as long as the expansion card 51 is held in the card receptacle 36.

The connection bracket 52 further comprises an engagement projection 57. The projection 57 is formed integral with the end of the main body 54, which is other than the end where the engagement strip 55 is provided. The engagement projection 57 is removably inserted into one of the engagement holes 50 of the slot panel 41 when the expansion card 51 is inserted into the card receptacle 36.

As FIGS. 2 and 3 show, the substrate 53 has four edges 58a to 58d. The first edge 58a extends in the widthwise direction of the housing 22. The connection bracket 52 is fastened to the first edge 58a. The second edge 58b opposes the first edge 58a and extends also in the widthwise direction of the housing 22. The third and fourth edges 58c and 58d, which oppose each other, extend in the depth direction of the housing 22. The third edge 58c is the leading edge of the expansion card 51 being inserted into the card receptacle 36. At the third edge 58c, a terminal section 59 is provided, which can be removably connected to the card connector 39. In the case where the substrate 53 has a full size, a card holder 60 is attached to the second edge 58b.

As seen from FIG. 2, the second partition 37b of the frame 23 opposes the slot panel 41 and supports a plurality of card guides 61. Each card guide 61 is designed to receive and hold the card holder 60 of an expansion card 51 having a full-size substrate 53 when the expansion card 51 is inserted into the card receptacle 36. The card holder 60 can slide in the card guide 61. The card guides 61 horizontally extend parallel to one another and are spaced from one another in the height direction of the housing 22. The guides 61 oppose the expansion slots 48, respectively.

How an expansion card 51 is inserted into the card receptacle 36 and electrically connected to the circuit board 38 will be explained. First, the body cover 25 is removed from the frame 23. Next, the expansion card 51 is inserted into the receptacle 36 through the opening 29 of the frame 23. In the process, the engagement projection 57 of the connection bracket 52 is kept aligned with one of the engagement holes 50 of the slot panel 41, while the card holder 60 is aligned with one card guide 61. When the card holder 60 is fitted into the card guide 61, the terminal section 59 of the substrate 53 is inserted into the card connector 39. The expansion card 51 is thereby electrically connected to the circuit board 38. When the expansion card 51 is thus held in the card receptacle 36, its connection bracket 52 covers or closes the expansion slot 48.

Figure 8:
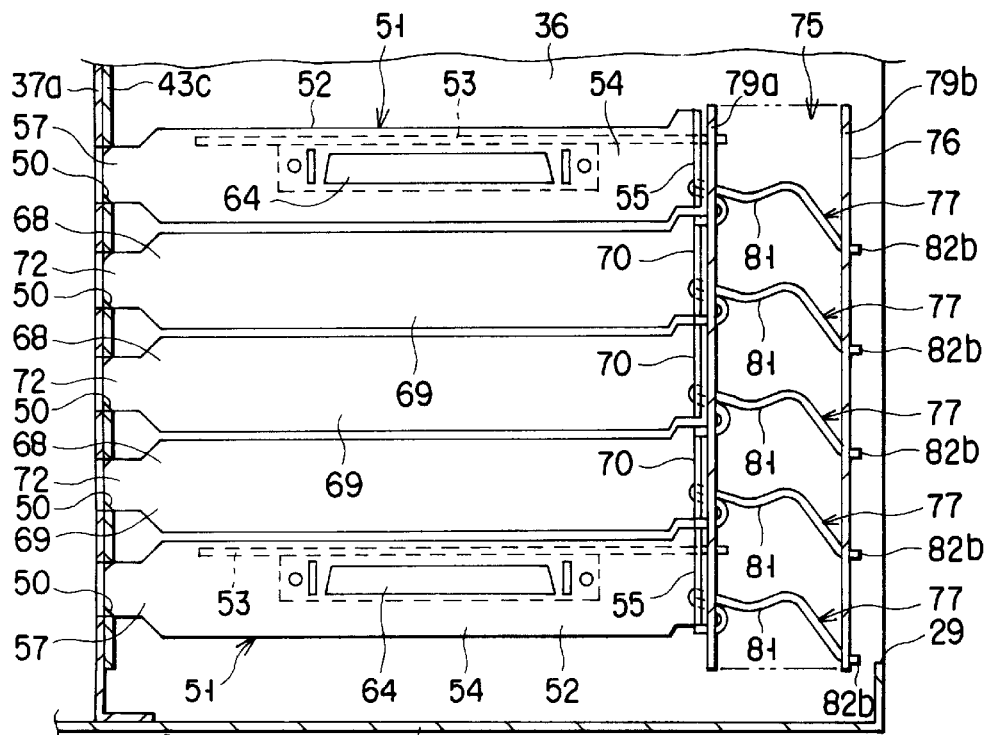
FIG. 8 is a sectional view of the PC server, illustrating the positional relation of the lock levers, the connection brackets of the expansion cards, and the slot covers.
Figure 9:
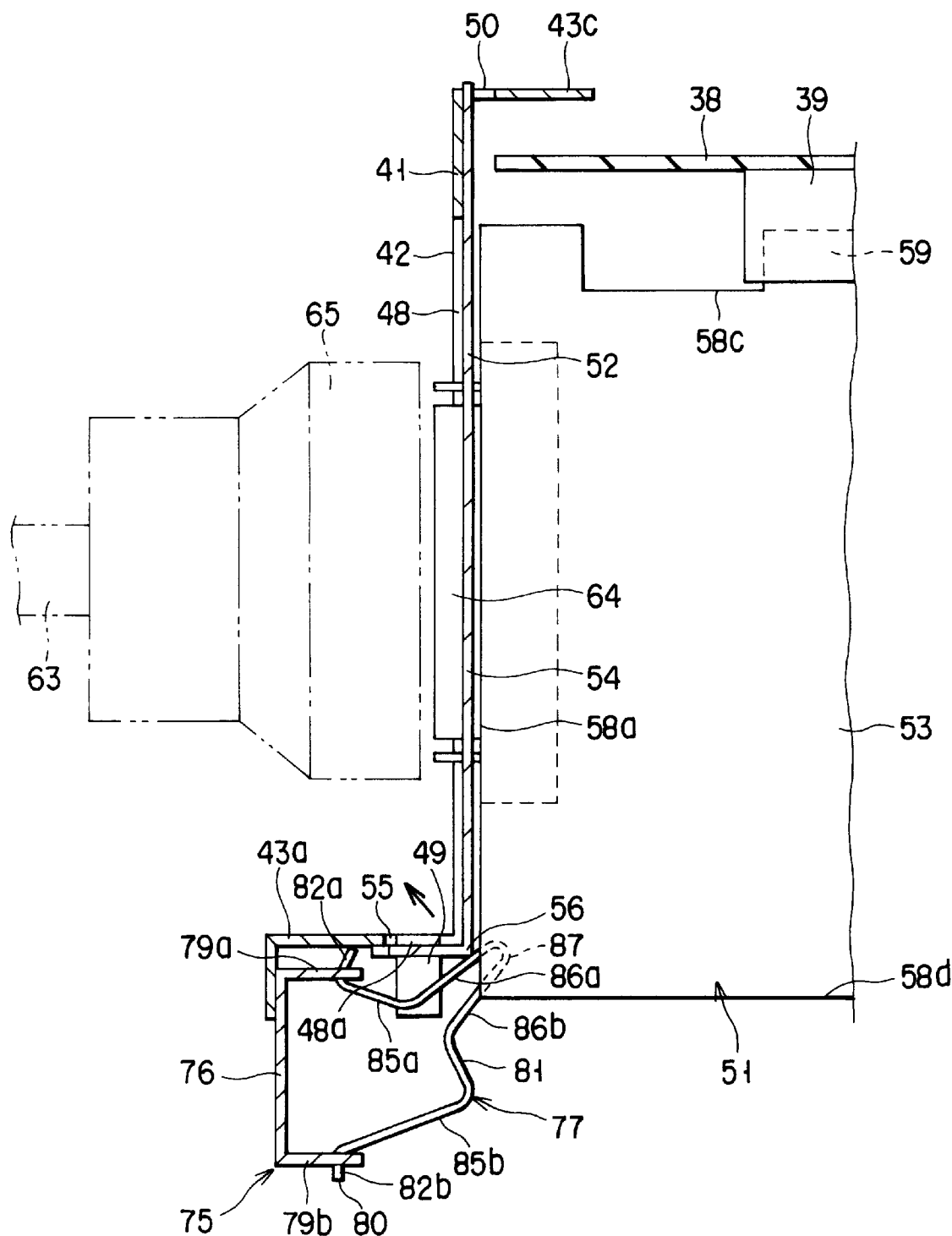
FIG. 9 is a sectional view, depicting an expansion card locked in the card receptacle by the use of a lock lever.

As depicted in FIGS. 8 and 9, some of the expansion cards 51 held in the card receptacle 36 may have a connector 64 each. The connector 64 is provided for connecting the expansion card 51 to a cable 63. The connector 64 is secured to the center part of the main body 54 and electrically connected to the substrate 53. The connector 64 is exposed outside through the expansion slot 48 when the expansion card 51 is inserted into the card receptacle 36 and held therein. The cable 63 has a cable connector 65. The cable connector 65 is removably connected to the connector 64 from the back of the housing 22.

As shown in FIGS. 6 and 8, the frame 23 has a plurality of slot covers 68, which are made of metal. Each slot cover 68 is provided to close one expansion slot 48 from within the card receptacle 36 after an expansion card 51 has been removed from the card receptacle 36 through the opening 29. Each slot cover 68 comprises an elongated main body 69 and an engagement strip 70. The main body 69 extends along the expansion slot 48. The engagement strip 70 is formed integral with one end of the main body 69.

The main body 69 of each slot cover 68 overlaps the first wall 42 of the slot panel 41, closing one expansion slot 48 from within the card receptacle 36. The engagement strip 70 extends from the end of the main body 69 at right angles thereto. The strip 70 overlaps the second wall 43a of the slot panel 41, closing the extension 48a of the expansion slot 48 from within the card receptacle 36. The lower edge of the strip 70 contacts the stopper strip 49. Thus, the engagement strip 70 supports the stopper strip 49 from below.

Each slot cover 68 has a right-angled corner 71 defined by the main body 69 and the engagement strip 70. The corner 71 opposes the opening 29 of the frame 23 when the slot cover 68 covers the expansion slot 48. The main body 69 has an engagement projection 72. The projection 72 is formed integral with the end of the main body 69, which is other than the end where the engagement strip 70 is provided. The engagement projection 72 is removably inserted into one of the engagement holes 50 of the slot panel 41 when the slot cover 68 is inserted into the card receptacle 36. Each slot cover 68 therefore has the same shape as the connection bracket 52 of each expansion card 51.

As shown in FIGS. 2, 3 and 6, a holding device 75 is provided in the card receptacle 36. The holding device 75 is designed to removably secure the expansion cards 51 and the slot covers 68 to the slot panel 41. The device 75 comprises a lever holder 76 and a plurality of lock levers 77. The lever holder 76 is made of metal. The holder 76 supports the lock levers 77.

The lever holder 76 extends in the height direction of the housing 22. The holder 76 is secured to the rear wall 28 of the frame 23 with screws and located between the second wall 43a of the slot panel 41 and the opening 29 of the frame 23. Hence, the lever holder 76 is adjacent to the opening 29 and the extension 48a of each expansion slot 48.

The lever holder 76 has two support walls 79a and 79b, which are spaced apart in the widthwise direction of the housing 22. The first support wall 79a opposes the second wall 43a of the slot panel 41. The first support wall 79a has a plurality of insertion holes 83a. Similarly, the second support wall 79b has a plurality of insertion holes 83b. The insertion holes of each support wall are arranged in the height direction of the lever holder 76 at the same regular intervals as the expansion slots 48 are arranged. Hence, they are aligned with the expansion slots 48, respectively, as viewed from the back of the housing 22. As viewed from either side of the housing 22, the insertion holes 83a and 83b are located at the back of the extensions 48a of the expansion slots 48.

Figures 10, 11, 12:
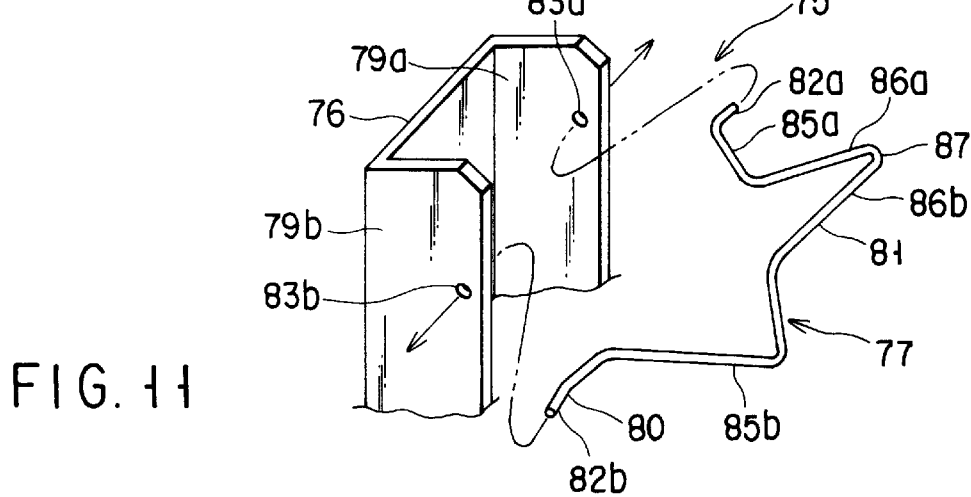
FIG. 10 is a plan view illustrating the dimensional relation between a lock lever and the lever holder associated with the lock lever.
FIG. 11 is a perspective view showing how the first and second shaft parts of a lock lever are inserted into the first and second holes of the holder associated with the lock lever.
FIG. 12 is a perspective view, showing the locus of a lock lever being rotated.

The lock levers 77 are provided at the expansion slots 48, respectively. As is best shown in FIGS. 10 to 12, each lock lever 77 comprises two support parts 80 and a pushing part 81. The support parts 80 are loosely fitted in the insertion holes 83a and 83b made in the support walls 79a and 79b of the lever holder 76. The lever holder 76 therefore holds each lock lever 77, allowing the same to rotate. The support parts 80 and the pushing part 81 are formed by bending a metal wire that has a circular cross section. The support parts 80 has arm parts 85a and 85b, respectively, which are spaced apart in the widthwise direction of the housing 22. Shaft parts 82a and 82b are formed integral with the distal ends of the arm parts 85a and 85b, respectively, and extend away from each other in the widthwise direction of the housing 22.

The first shaft part 82a has its distal end loosely fitted in the insertion hole 83a of the first support wall 79a. Similarly, the second shaft part 82b has its distal end loosely fitted in the insertion hole 83b of the second support wall 79b. The other parts of both shaft parts 82a and 82b are located between the support walls 79a and 79b of the lever holder 76. The lock lever 77 can therefore be rotated around the common axis of the support holes 83a and 83b.

As FIGS. 9 and 10 show, the pushing part 81 of each lock lever 77 has a pair of extensions 86a and 86b. The extensions 86a and 86b are formed integral with the arm parts 85a and 85b, respectively, and extend therefrom toward the second wall 43a of the slot panel 41. The extensions 86a and 86b are spaced part in the widthwise direction of the housing 22. They are connected together at their distal ends, which form an arcuate junction 87. The part of the lock lever 77, consisting of the first arm part 85a and first extension 86a, and the part of the lever 77, consisting of the second arm part 85b and second extension 86b, can elastically deform to move away and toward each other, with the junction part 87 as fulcrum. Therefore, these parts of the lock lever 77 are biased to moved away from each other, as long as the shaft parts 82a and 82b are fitted in the insertion holes 83a and 83b of the lever holder 76.

As illustrated in FIG. 10, the shaft parts 82a and 82b of each lock lever 77 are spaced by a distance L1 before the lock lever 77 is fitted to the lever holder 76, or when the lever 77 remains in free state. The distance L1 longer than the distance L2 between the support walls 79a and 79b of the lever holder 76. Hence, once the shaft parts 82a and 82b have been inserted into the insertion holes 83a and 83b of the support walls 79a and 79b, the arm parts 85a and 85b are elastically deformed toward each other. In this condition, the distal ends of the arm parts 85a and 85b remain pushed onto the inner surfaces of the support walls 79a and 79b, respectively. As a result, friction develops between the first arm part 85a and the first support wall 79a and also between the second arm part 85b and the second support wall 79b. The friction restricts the rotation of the lock lever 77.

Thus held by the lever holder 76, each lock lever 77 can rotate with the shaft parts 82a and 82b as fulcrum, between the first position where the arm parts 85a and 85b and extensions 86a and 86b extend almost horizontally and the second position where the arm parts 85a and 85b and extensions 86a and 86b stand upright.

When the lock lever 77 is rotated to the first position as shown in FIGS. 6 and 9, the part consisting of the first arm part 85a and first extension 86a moves across the engagement strip 55 of the connection bracket 52 of the expansion card 51 or the side of the engagement strip 70 of the slot cover 68. At the same time, the extension 86a resiliently abuts onto the corner 56 of the connection bracket 52 or the corner 71 of the slot cover 68. The corner 56 or 71 is pushed in a backward and slantwise direction of the housing 22, as is indicated by arrow in FIG. 9. The lock lever 77 keeps pushing the corner 56 or 71 as long as it remains at the first position. Hence, the connection bracket 52 or the slot cover 68 remains pushed onto the slot panel 41 all the time the lock lever 77 stays at the first position.

Figure 7:
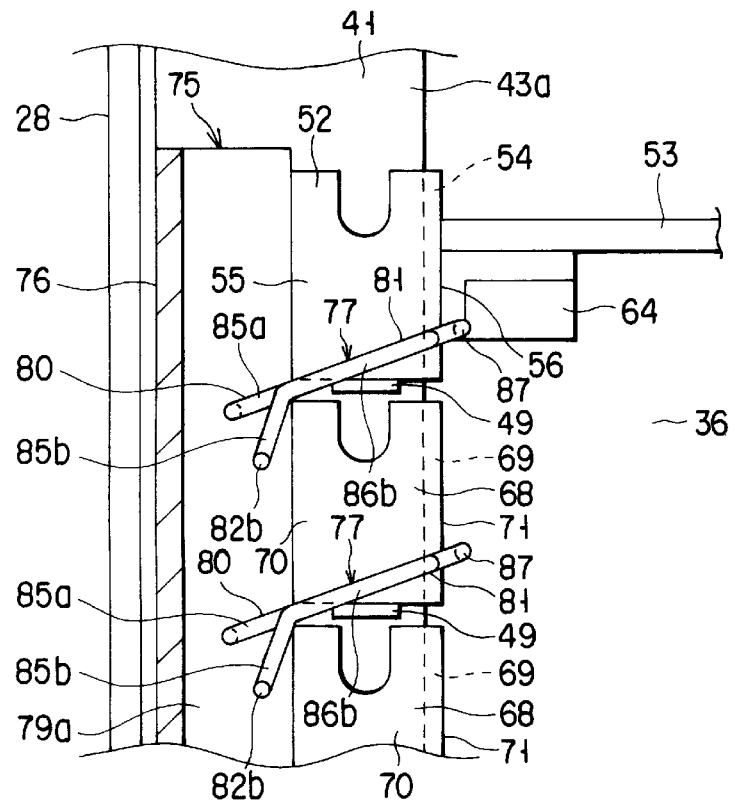
FIG. 7 is a sectional view of the card receptacle, showing the connection brackets of expansion cards and the slot cover, all locked by the use of the lock members.

When the lock lever 77 is rotated to the first position as shown in FIGS. 6 and 7, its first extension 86a abuts onto the stopper strip 49 of the slot panel 41. This prevents the lock lever 77 from rotating excessively, reliably holding the lock lever 77 at the first position. As long as the lock lever 77 remains at the first position as shown in FIG. 7, both arm parts 85a and 85b of the lever 77 are located adjacent to either the upper edge of the engagement strip 55 of the other immediately lower connection bracket 52 or the upper edge of the engagement strip 70 of the other immediately lower slot cover 68.

When the lock lever 77 is rotated to the second position, its first arm part 85a and first extension 86a move backward, leaving the engagement strip 55 of the connection bracket 52 or the engagement strip 70 of the slot cover 68. At the same time, the extension 86a moves upward from the corner 56 of the connection bracket 52 or the corner 71 of the slot cover 68. The lock lever 77 no longer holds the corner 56 or 71, and the expansion card 51 or the slot cover 68 can now be pulled toward the opening 29 of the frame 23.

As shown in FIG. 9, the first shaft part 82a of the lock lever 77 is located adjacent to the engagement strip 55 of the connection bracket 52 or the engagement strip 70 of the slot cover 68. The first shaft part 82a is bent by an angle α toward the first arm part 85a. Thus bent, the first shaft part 82a is prevented from slipping out of the first insertion hole 83a.

As illustrated in FIG. 12, each lock lever 77 can rotate around a rotation axis X1, which is a line connecting the shaft parts 82a and 82b. The rotation axis X1 extends in the widthwise direction of the housing 22. The second insertion hole 83b, in which the second shaft part 82b is inserted, is displaced downward by a distance E from a horizontal line X2 which extends in the widthwise direction of the housing 22 and which passes through the first insertion hole 83a. Therefore, the rotation axis X1 of the lock lever 77 inclines downward, gradually leaving the second wall 43a of the slot panel 41. Since the rotation axis X1 of the lock lever 77 inclining so, the junction part 87 (i.e., the distal part of the lock lever 77) moves, leaving the second wall 43a of the slot panel 41 and drawing an arcuate locus R1 shown in a solid line in FIG. 12, as the lever 77 is rotated from the first position to the second position. As shown in FIG. 12, the locus R1 is inclined away from the second wall 43a of the slot panel 41.

If the lock lever 77 were rotated around the horizontal line X2, the junction part 87 should move, drawing an arcuate locus R2 existing in a plane parallel to the engagement strip 55 of the connection bracket 52 or the engagement strip 70 of the slot cover 68. At the second position of the lock lever 77, the locus R2 is closer to the second wall 43a of the slot panel 41 than the locus R1 by a distance F. Thus, when the lock lever 77 is rotated around the axis X1 to the second position, its junction part 87 is located farther from the second wall 43a of the slot panel 41 by the distance F than if the lever 77 were rotated around the horizontal line X2.

It will be described how an additional expansion card 51 is held in the card receptacle 36 of the PC server 21 described above.

First, the body cover 25 is removed from the frame 23. The card receptacle 36 and the holding device 75 are exposed through the opening 29 of the frame 23. The user inserts the hand into the opening 29 and pinches the lock lever 77 of the desired expansion slot 48 with the fingers. Then, he or she rotates the lock lever 77 from the first position to the second position. The pushing part 81 of the lock lever 77 is thereby moved from the corner 71 of the slot cover 68. Thus moved, the lock lever 77 releases the slot cover 68. The user can therefore pull the slot cover 68 from the card receptacle 36 through the opening 29 of the frame 23. Thus, the expansion slot 48 is opened.

Next, an expansion card 51 is inserted into the receptacle 36 through the opening 29 of the frame 23. In the process, the card 51 is positioned, with its connection bracket 52 aligned with the expansion slot 48 and the card holder 60 of its substrate 53 aligned with the card guide 61. The extension card 51 is pushed further into the card receptacle 36 until it reaches a prescribed position in the card receptacle 36. As a result, the terminal section 59 of the substrate 53 is inserted into the card connector 39. The expansion card 51 is thereby electrically connected to the circuit board 38. At the same time, the engagement projection 57 of the connection bracket 52 is inserted into one of the engagement holes 50 of the slot panel 41, and the engagement strip 55 of the connection bracket 52 is supported by the stopper strip 49 of the slot panel 41. The connection bracket 52 therefore overlaps the slot panel 41 and closes the expansion slot 48.

Next, the user pinches the lock lever 77 with the fingers and rotates the lever 77 from the second position to the first position. The pushing part 81 of the lever 77 resiliently abuts onto the corner 56 of the connection bracket 52, pushing the connection bracket 52 in the backward and slantwise direction of the housing 22. The main body 54 of the bracket 52 is pushed onto the first wall 42 of the slot panel 41, and the engagement strip 55 of the bracket 52 is pushed onto the second wall 43a of the slot panel 41. The substrate 53 of the expansion card 51 is thereby locked in the card receptacle 36 and grounded to the slot panel 41 by the connection bracket 52.

If the expansion cars 51 now held in the card receptacle 36 has a connector 64, the connector 64 is exposed at the back of the housing 22 through the expansion slot 48. If necessary, the connector 64 is connected to the cable connector 65 of an external apparatus.

At last, the body cover 25 is secured back to the frame 23, covering the frame 23. Thus, the additional expansion card 51 is held in the card receptacle 36.

It will be described how any one of the expansion cards 51 is removed from the card receptacle 36 of the PC server 21.

First, the body cover 25 is removed from the frame 23, as in the case of placing an additional expansion card 51 in the card receptacle 36. The card receptacle 36 and the holding device 75 are thereby exposed through the opening 29 of the frame 23.

Next, the user inserts the hand into the opening 29 and pinches the lock lever 77 of the desired expansion slot 48 with the fingers. Then, he or she rotates the lock lever 77 from the first position to the second position. The pushing part 81 of the lock lever 77 is thereby moved from the corner 56 of the connection bracket 52 of the expansion card 51. The bracket 52 is thereby unlocked. Thereafter, the user pinches the fourth edge 58d of the substrate 58 and pulls the expansion card 51 toward the opening 29 of the frame 23 until the terminal section 59 is released from the card connector 39. The expansion cars 51 may be one having a connector 64 that is connected to a cable connector 65. In this case, the cable connector 65 is disconnected from the connector 64 after the terminal section 59 has been released from the card connector 39.

Further, the user moves the slot cover 68 from the opening 29 of the frame 23 to the card receptacle 36 and pushes the main body 69 of the cover 68 along the first wall 42 of the slot panel 41. When the slot cover 68 reaches a prescribed position in the card receptacle 36, its engagement projection 72 is inserted into one of the engagement holes 50 of the slot panel 41. At the same time, the engagement strip 70 of the slot cover 68 catches the stopper strip 49 of the slot panel 41. As a result, the slot cover 68 closes the expansion slot 48.

Then, the user pinches the lock lever 77 with the fingers and rotates the lever 77 from the second position to the first position. The pushing part 81 of the lock lever 77 is thereby made to abut on the corner 71 of the slot cover 68, pushing the cover 68 in the backward and slantwise direction of the housing 22. The main body 69 of the slot cover 68 is thereby pushed onto the first wall 42 of the slot panel 41, and the engagement strip 70 is also pushed onto the second wall 43a of the slot panel 41. The slot cover 68 is thus locked in the card receptacle 36.

Finally, the user attaches the body cover 25 to the frame 23, covering the opening 29 of the frame 23. Thus, the expansion card 51 is completely removed from the card receptacle 36 of the PC server 21.

With the PC server 21 it suffices to rotate one lock lever 77 from the first position to the second position in order to lock an expansion card 51 in the card receptacle 36, and from the second position to the first position in order to removed the expansion card 51 from the card receptacle 36. The user need not use a tool, such as a screwdriver, to lock the expansion card 51 in, or removed it from, the card receptacle 36. Hence, the expansion card 51 can be locked in and removed from the card receptacle 36, both easily and quickly.

Since each lock lever 77 is made of a metal wire. Thus, when the pushing part 81 abuts on the connection bracket 52 or the slot cover 68, the arm parts 85a and 85b are elastically deformed, approaching each other, the extensions 86a and 86b are elastically deformed, approaching each other. Suppose the engagement strip 55 of the bracket 52 has a projection extending toward the second wall 43a of the slot panel 41 and therefore reinforcing the ground of the expansion card 51. Then the corner 56 of the bracket 52 is displaced toward the opening 29 by the height of this projection. Therefore, the lock lever 77 will be greatly deformed elastically in accordance with the position of the corner 56 when the pushing part 81 of the lever 77 abuts on the corner 56. Thus deformed, the lever 77 compensates for the displacement of the corner 56, which accompanies the deformation of the connection bracket 52.

As a result of this, the connection bracket 52 receives the resilient force of the lock lever 77 so long as the lever 77 remains in the first position. The lock lever 77 applies a sufficient pressure on the bracket 52, holding the bracket 52 firmly onto the slot panel 41, regardless of the size and shape of the connection bracket 52. Both the expansion card 51 and the slot cover 68 are therefore steadily held at desired positions.

As mentioned above, the pushing part 81 of the lock lever 77 abuts on the corner 56 of the connection bracket 52 and pushes the corner 56 in the backward and slantwise direction of the housing 22. The pushing force exerted on the bracket 52 consists of the first component applied toward the side of the card receptacle 36 and the second components applied toward the back of the card receptacle 36, respectively. The second component works against an external force, if any, exerted to the main body 54 of the bracket 52 to push the same into the card receptacle 36 when the cable connector 65 is connected to the connector 64 of the bracket 52.

The expansion card 51 placed in the card receptacle 36 is therefore prevented from being pushed toward the card guide 61 when the cable connector 65 is connected to the connector 64. Thus, no excessive force is applied to the junction between the card connector 45 and the terminal section 59 of the expansion card 51.

Of the components of the lock lever 77, the first shaft part 82a, which is adjacent to the engagement strip 70 of the slot cover 68, is bent and inclined at an angle α to the widthwise direction of the housing 22. Thus bent, the first shaft part 82a is prevented from slipping out of the first insertion hole 83a even when the first arm part 85a adjacent to the first shaft part 82a is pushed away from the engagement strip 55 or 70 as the lock lever 77 is rotated to the first position and its pushing part 81 abuts on the connection bracket 52 or the slot cover 68. The pushing part 81 of the lock lever 77 can therefore be reliably pushed onto the corner 56 or 71. This makes it possible to hold, with high precision, both the expansion card 51 and the slot cover 68 at desired positions.

As indicated above, the rotation axis X1 of the lock lever 77 inclines downward, gradually leaving the second wall 43a of the slot panel 41. Therefore, the junction part 87 of the lock lever 77 moves, leaving the engagement strip 55 of the connection bracket 52 or the engagement strip 70 of the slot cover 68. As the lever 77 moves so, it draws an arcuate locus R1 (FIG. 12), as the lever 77 is rotated from the first position to the second position. Hence, it is possible to reduce the pressure that the pushing part 81 exerts on the engagement strip 55 or 70 to release either the expansion card 51 or the slot cover 68. This helps to decrease the force required to rotate the lock lever 77 to release the expansion card 51 or the slot cover 68.

While the lock lever 77 remains at the second position, its pushing part 81 is at a distance F from the engagement strip 55 or the engagement strip 70. The pushing part 81 does not interfere with the engagement strip 55 or the engagement strip 70 when the lock lever 77 is rotated from the second position to the first position. In other words, the lock lever 77 can be smoothly rotated. The expansion card 51 can be held in and removed from the card receptacle 36 with high operating efficiency.

The present invention is not limited to the first embodiment described above. The second embodiment of the invention will be described, with reference to FIGS. 13 and 14.

The second embodiment differs from the first embodiment, only in the shape of the lock levers 90. The components similar or identical to those of the first embodiment are designated at the same reference numerals as in FIGS. 1 to 12 and will not be described in detail.

Figure 13:
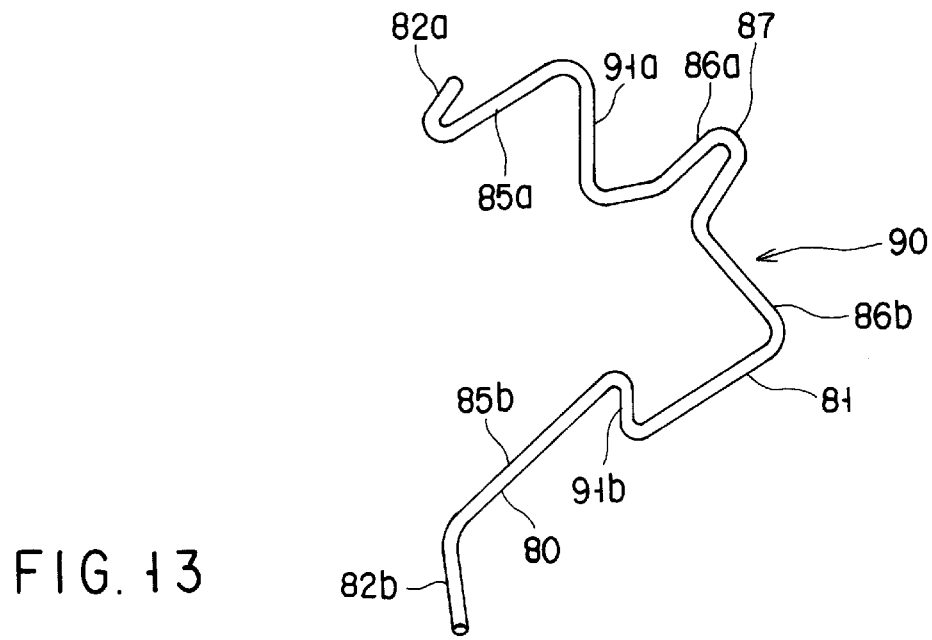
FIG. 13 is a perspective view of one of the lock levers used in the second embodiment of the present invention.

As shown in FIG. 13, the first and second arm parts 85a and 85b of each lock lever 90 have an escaping part 91a and an escaping part 91b, respectively. The first escaping part 91a has been formed by bending the portion of the first arm part 85a, continuous to the extension 86a, at about right angles to the extension 86a. The second escaping part 91b has been formed by bending the portion of the second arm part 85b, continuous to the extension 86b, at about right angles to the extension 86b.

Figure 14:
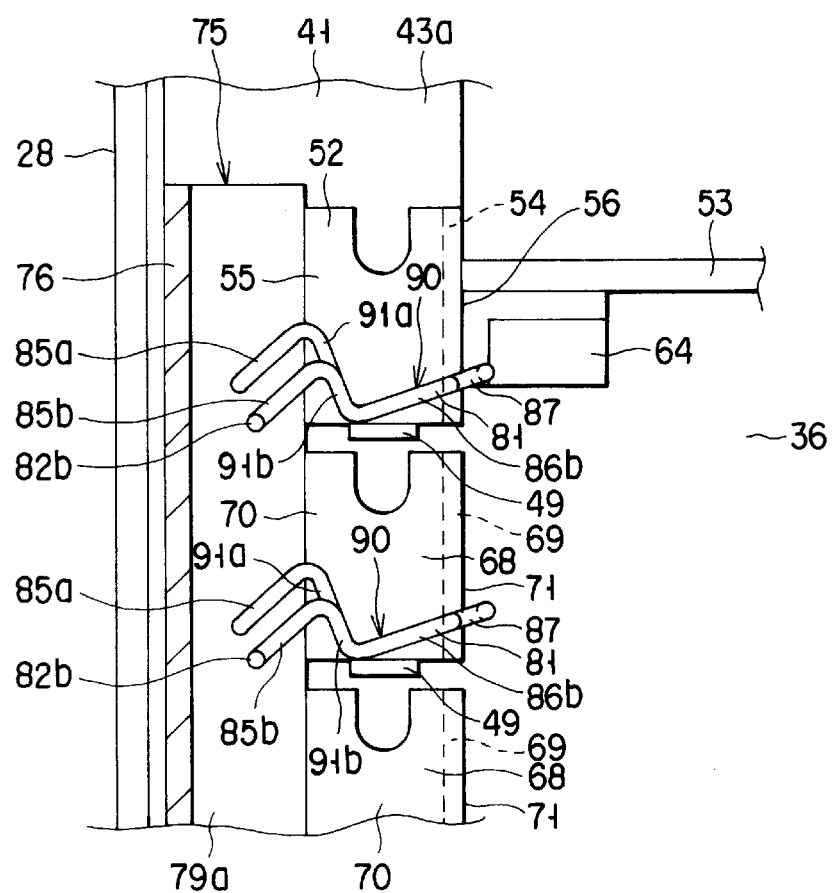
FIG. 14 is a sectional view of a card receptacle, showing connection brackets and slot covers which have been lock by the use of lock levers.

As illustrated in FIG. 14, both escaping parts 91a and 91b extend in the height direction of the lever holder 76 as long as the lock lever 77 stays at the first position. In this condition, the arm parts 85a and 85b are located respectively above the extensions 86a and 86b by the lengths of the escaping parts 91a and 91b. Hence, the arm parts 85a and 85b are spaced from the upper edge of the engagement strip 55 of the connection bracket 52 or from the upper edge of the engagement strip 70 of the slot cover 68. This is because the engagement strips 55 and 70 are positioned below the arm parts 85a and 85b. Thanks to the escaping parts 91a and 91b, the arm parts 85a and 85b have no chance of interfering with the engagement strips 55 and 70, respectively.

When the lock lever 90 is rotated from the second position to the first position, its escaping parts 91a and 91b extend away from the upper edge of the engagement strip 55 of the connection bracket 52 arranged immediately below the lock lever 90, or from the upper edge of the engagement strip 70 of the slot cover 68 arranged immediately below the lock lever 90. Neither the first arm part 85a nor the second arm part 85b would interfere with the slot cover 68 located below the first arm part 85 or the connection bracket 52 of the other card 51 located below the first arm part 85. Thus, the lock lever 90 is not interfered with the adjacent lock lever 90 when rotated to insert an expansion card 51 into the card receptacle 36 or to remove the card from the card receptacle 36. This facilitates the insertion and removal of the expansion card 51.

Figure 15:
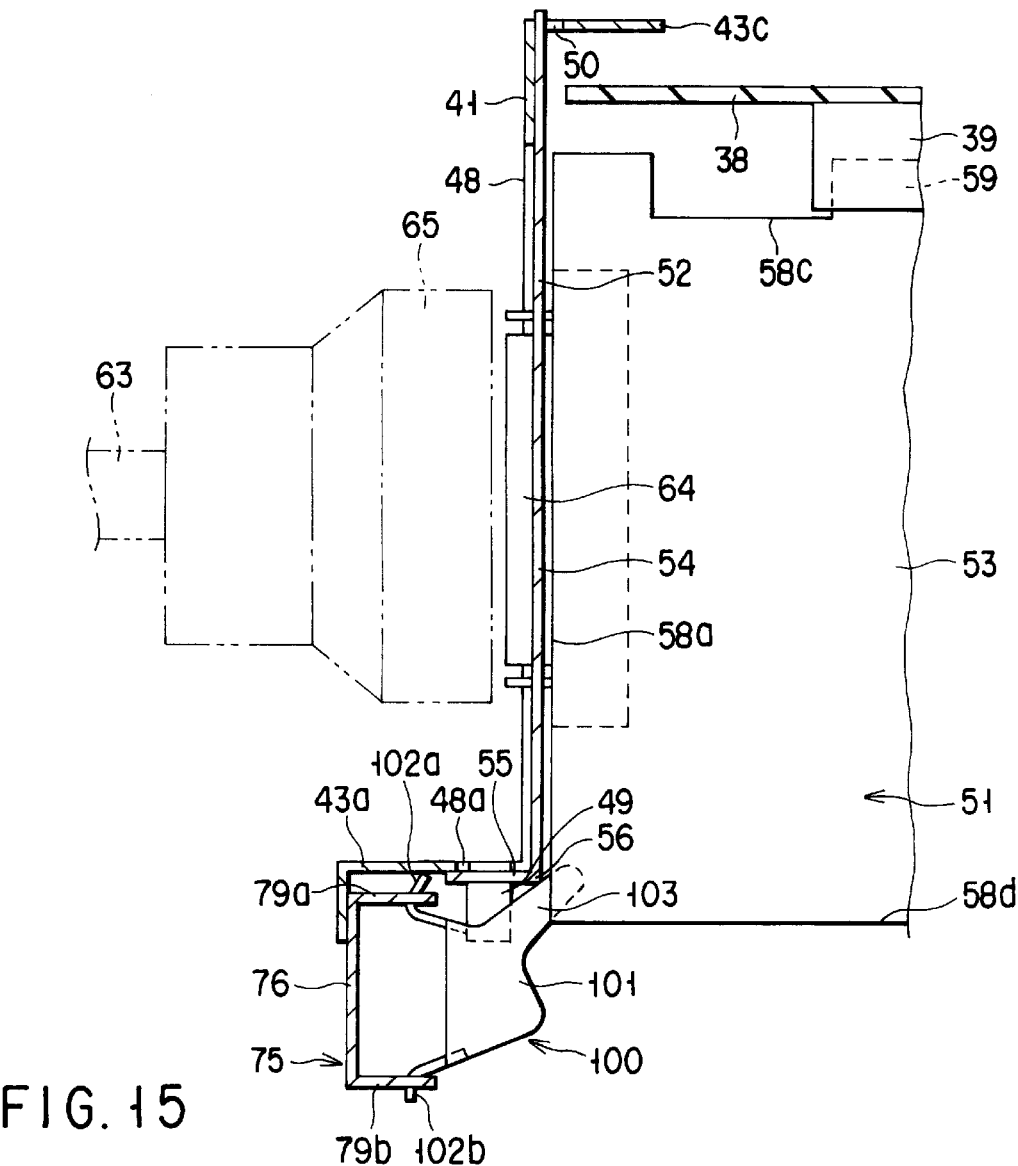
FIG. 15 is a sectional view of the third embodiment of the invention, showing an expansion card locked in a card receptacle by the use of a lock lever.
Figure 16:
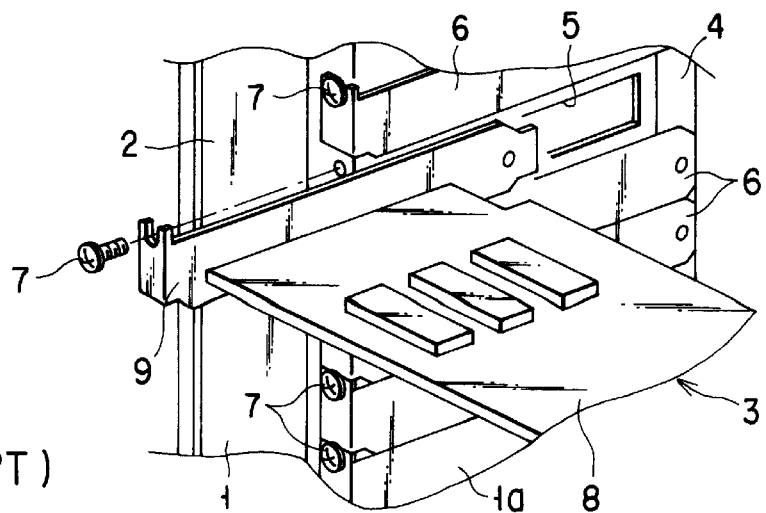
FIG. 16 is a perspective view of a conventional expansion-card support structure.

FIG. 15 shows the third embodiment of the invention. The third embodiment differs from the first embodiment, only in the structure of the lock levers 100. The components similar or identical to those of the first embodiment are designated at the same reference numerals as in FIGS. 1 to 12 and will not be described in detail.

As shown in FIG. 15, each lock lever 100 comprises a plate-like pushing part 101 and two shaft parts 102a and 102b connected to one side of the pushing part 101. The pushing part 101 is made of elastic material such as sheet metal, rubber or the like. The pushing part 101 has an extension 103 extending toward the corner 56 of the connection bracket 52 of an expansion card 51. The extension 103 extends from that side of the pushing part 101, which opposes the first-mentioned side. The extension 103 may contact, at its one edge, the corner 56 of the bracket 52.

Both shaft parts 102a and 102b have their distal end portions inserted respectively in the insertion holes 83a and 83b of the lever holder 76. Hence, the lever holder 76 supports the lock lever 100. The distal end portions of the shaft parts 102a and 102b can rotate around their axes. The lock lever 100 can therefore rotate between the first position where the extension 103 falls down and abuts on the corner 56 and the second position where the extension 103 stands upright and is spaced from the corner 56. When the lock lever 100 is rotated to the first position and the edge of the extension 103 abuts on the corner 56, the pushing part 101, including the extension 103, deforms elastically. The elastic force inherent to the pushing part 101 is transmitted to the corner 56 of the connection bracket 52.

With the third embodiment it suffices to rotate each lock lever 100 to the first position in order to lock an expansion card 51 in the card receptacle 36, and to the second position in order to remove the expansion card 51 from the card receptacle 36. Hence, the expansion card 51 can be locked in and removed from the card receptacle 36, both easily and quickly.

The information apparatus according to the present invention is not limited to a PC server. Rather, it may be, for example, a desktop computer, as well.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An expansion card support structure comprising:
a card receptacle comprising a card insertion port and a support wall having at least one expansion slot;
at least one expansion card removably inserted into the card receptacle through the card insertion port and having a substrate and a connection bracket which is connected to an edge of the substrate and which covers the expansion slot; and
at least one lock member provided for the expansion slot and supported in the card receptacle to rotate between first and second positions, said lock member contacting the connection bracket while remaining at the first position, thereby to lock the expansion card in the card receptacle, spaced apart from the connection bracket while remaining at the second position, thereby to release the expansion card from the card receptacle, and said at least one lock member contacting the connection bracket and being elastically deformed while remaining at the first position, thereby to clamp the connection bracket in cooperation with the support wall.

2. The structure according to claim 1, wherein the connection bracket extends along the expansion slot, the substrate has an edge extending in a direction at right angles to the connection bracket and a terminal section provided at this edge, and the card receptacle has at least one card connector to which the terminal section is removably connected.

3. The structure according to claim 2, wherein the support wall of the card receptacle includes a first wall having the expansion slot and a second wall extending outwardly from one end of the first wall, the connection bracket has a main body overlapping the first wall and closing the expansion slot, an engagement strip made integral with one end of the main body and overlapping the second wall, and a corner defined by the main body and the engagement strip, and the lock member is elastically pushed onto the corner when rotated to the first position.

4. The structure according to claim 3, wherein the main body of the connection bracket has an engagement projection at an end facing away from the engagement strip, said engagement projection removably engaged with the card receptacle.

5. The structure according to claim 3, wherein the lock member includes support parts rotatably supported by the card receptacle and a pushing part made integral with the support parts, for pushing the corner of the connection bracket, the support parts have a common axis inclined such that a distal end of the pushing part leaves from the corner of the connection bracket when the lock member is rotated around the common axis from the first position to the second position.

6. The structure according to claim 5, wherein the lock member is formed by bending one metal wire, and at least the support parts of the lock member function as springs.

7. The structure according to claim 5, wherein the support parts of the lock member have a first arm part and a first shaft part and a second arm part and a second shaft part, respectively, said first and second arm parts spaced apart from each other and said first and second shaft parts extend respectively from the first and second arm parts and away from each other, the card receptacle has a pair of support walls having insertion holes in which the first and second shaft parts are rotatably inserted, and the shaft parts of the lock member are spaced by a distance longer than a distance between the support walls before the shaft parts are inserted into the insertion holes.

8. The structure according to claim 3, wherein the second wall has a stopper for holding the lock member at the first position, and the stopper abuts on the lock member to prevent excessive rotation of the lock member, when the lock member is rotated to the first position.

9. The structure according to claim 1, further comprising a slot cover for covering the expansion slot while the expansion card remains outside the card receptacle, said slot cover having the same shape as the connection bracket and supported to the support wall by the lock member.

10. An expansion card support structure comprising:

a card receptacle comprising a card insertion port and a support wall having at least one expansion slot;

an expansion card removably inserted into the card receptacle through the card insertion port and including a connection bracket covering the expansion slot and a substrate connected to the connection bracket, said connection bracket having a main body extending along the expansion slot, an engagement strip extending form an end of the main body at substantially right angles toward the support wall, and a corner defined by the main body and the engagement strip; and a lock member provided for the expansion slot and supported in the card receptacle to rotate between first and second positions, said lock member contacting the corner of the connection bracket while remaining at the first position, thereby to lock the expansion card in the card receptacle, spaced apart from the connection bracket while remaining at the second position, thereby to release the expansion card from the card receptacle, and said lock member contacting the corner and being elastically deformed while remaining at the first position, thereby to clamp the connection bracket in cooperation with the support wall.

11. The structure according to claim 10, wherein the connection bracket has a connector exposed outside the card receptacle, through the expansion slot.

12. The structure according to claim 10, wherein the substrate has an edge extending in a direction at right angles to the connection bracket and a terminal section provided at this edge, and the card receptacle has at least one card connector to which the terminal section is removably connected.

13. An expansion card support structure comprising:

a card receptacle comprising a support wall having a plurality of expansion slots arranged in a column and spaced part from one another, and a card insertion port open to the support wall, said support wall comprising a first wall having the expansion slots and a second wall extending outwardly at substantially right angles from one end of the first wall;

a plurality of expansion cards removably inserted in the card receptacle through the card insertion port, each of the expansion cards including a connection bracket covering one expansion slot and a substrate connected to the connection bracket, said connection bracket having a main body overlapping the first wall and closing the expansion slot, an engagement strip made integral with an end of the main body and overlapping the second wall, and a corner defined by the main body and the engagement strip; and a plurality of lock members provided for the expansion slots, respectively, opposing the second wall, arranged at intervals in a direction in which the expansion slots are arranged in a column, and supported in the card receptacle to rotate between first and second positions, each of said lock members contacting the corner of the connection bracket while remaining at the first position, thereby to lock the expansion card in the card receptacle, spaced apart from the connection bracket while remaining at the second position, thereby to release the expansion card from the card receptacle, said plurality of lock members contacting the corner and being elastically deformed while remaining at the first position, thereby to clamp the connection bracket in cooperation with the support wall, and having escaping parts for preventing the lock member from interfering with the engagement strip of an expansion card adjacent to the expansion card.

14. An information apparatus comprising:

a housing;

a card receptacle provided in the housing, comprising a support wall having a plurality of expansion slots arranged in a column and spaced part from one another, and a card insertion port open to the support wall;

a plurality of expansion cards removably inserted in the card receptacle through the card insertion port, each of the expansion cards having a connection bracket covering one expansion slot and a substrate connected to the connection bracket; and a plurality of lock members provided for the expansion slots, arranged at intervals in a direction in which the expansion slots are arranged in a column, and supported in the card receptacle to rotate between first and second positions, each of said lock members contacting the connection bracket while remaining at the first position, thereby to lock the expansion card in the card receptacle, spaced apart from the connection bracket while remaining at the second position, thereby to release the expansion card from the card receptacle, and said plurality of lock members contacting the connection bracket and being elastically deformed while remaining at the first position, thereby to clamp the connection bracket in cooperation with the support wall.

15. The apparatus according to claim 14, further comprising a plurality of slot covers for covering the expansion slots, respectively, while the expansion card remains outside the card receptacle, said slot covers having the same shape as the connection bracket and supported to the support wall by the lock members.

* * * * *

UNITED STATES PATENT AND TRADEMARK OFFICE
CERTIFICATE OF CORRECTION

PATENT NO. : 6,160,712
DATED : December 12, 2000
INVENTOR(S) : Fumio Itai et al.

Page 1 of 1

It is certified that error appears in the above-identified patent and that said Letters Patent is hereby corrected as shown below:

Column 17, claim 10,
Line 13, "form an end" should read -- from an end --.

Column 17, claim 13,
Line 41, "spaced part" should read -- spaced apart --.

Column 18, claim 14,
Line 24, "spaced part" should read -- spaced apart --.

Signed and Sealed this

Sixteenth Day of April, 2002

Attest:

JAMES E. ROGAN
Director of the United States Patent and Trademark Office

Attesting Officer